(No Model.)
W. W. WEBB.
PLOW.
No. 356,808. Patented Feb. 1, 1887.
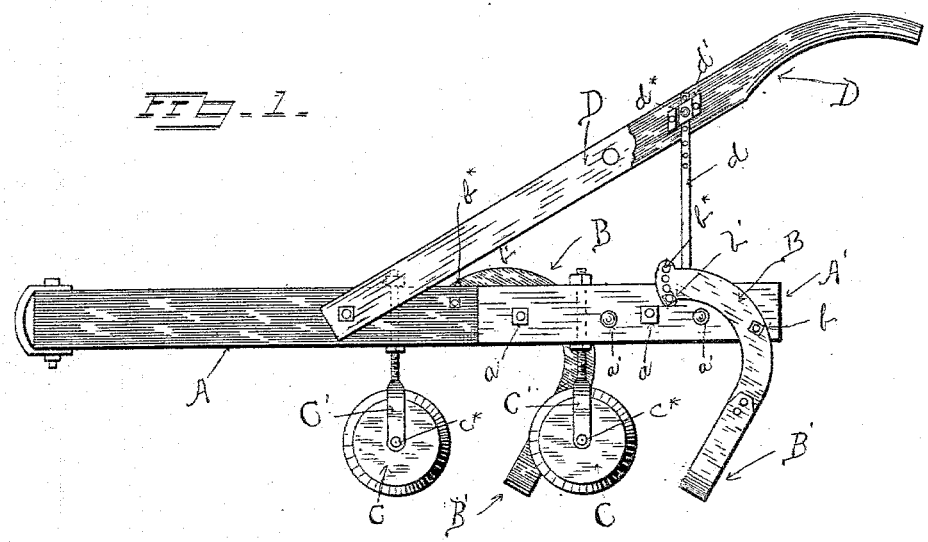
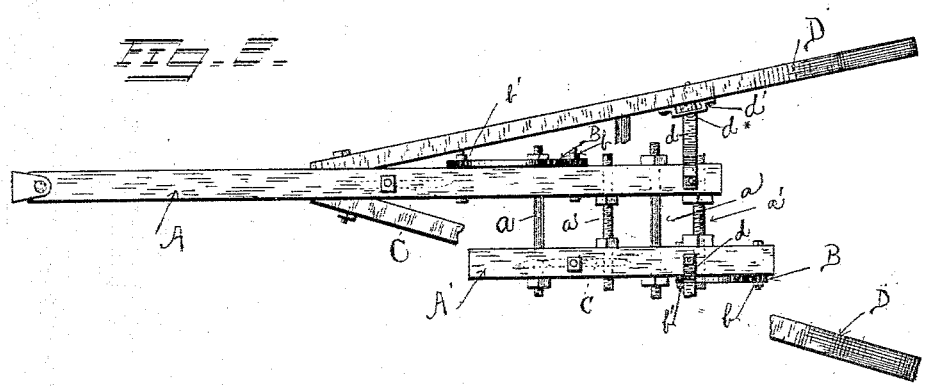
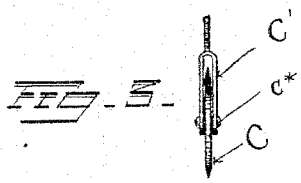
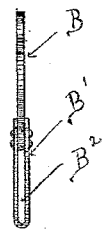
Witnesses
Inventor
Wm. W. Webb,
By his Attorney

UNITED STATES PATENT OFFICE.

WILLIAM W. WEBB, OF LOWNDES COUNTY, GEORGIA.

PLOW.

SPECIFICATION forming part of Letters Patent No. 356,808, dated February 1, 1887.

Application filed February 27, 1886. Serial No. 193,505. (No model.)

*To all whom it may concern:*

Be it known that I, WILLIAM W. WEBB, a citizen of the United States, residing in the county of Lowndes and State of Georgia, have invented certain new and useful Improvements in Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to plows, and has for its object the provision of a plow capable of numerous adjustments and changes to render it available for various forms of work.

I will outline the several changes which may be accomplished with my device, and will then proceed to give a detailed description of the construction and manner of operating the plow, and finally point out the invention in the claim.

The plow has a detachable short beam, which can be readily removed to make a single-shovel plow, or set in place to make a double-shovel plow. The means for attaching this second beam are of such character as to render the said beam laterally adjustable in order to bring the plows nearer together or farther apart. The feet, or what are ordinarily termed the "standards," are curved pieces of metal bar united to the beams by bolts at bottom and top of beams, and the said feet have several openings or holes in the front end to enable them to be adjusted, and consequently throw the point of the shovel farther forward or back. The lower ends of the feet are slotted vertically so as to receive and hold the shovels or plows at any height desired. In front of the shovels or plows are the clod-cutters, which are sharp-edged disks of steel held in a bifurcated arm with liberty to revolve. These arms pass through the beams, and have nuts both above and below said beams, so as to adjust the cutters to the required height. The handles, which are both united to the long beam in front, have bar-supports at a suitable point, and by means of suitable adjusting means can be set higher or lower as may be required by the plowman.

The accompanying drawings illustrate what I consider the best means for carrying my invention into practice.

Figure 1 is a side view showing one of the handles broken away. Fig. 2 is a plan view with one handle broken away. Fig. 3 is an end view of the clod-cutter. Fig. 4 is an end view of one of the feet or shovel-supports.

Similar letters of reference indicate corresponding parts in all the figures where they occur.

A is the long or main beam of the plow. A' is the short beam. The two beams are connected together by bolts $a\,a$ and $a'\,a'$. The bolts $a\,a$ extend through and have nuts on the outside of the beams, while the bolts $a'\,a'$ have the nuts inside of or between the beams. By setting the nuts on bolts $a'\,a'$ at suitable distances apart and tightening the nuts on bolts $a\,a$ the plows are set at any distance from each other.

With the inside or spreading nuts on one set of bolts, $a'\,a'$, and the outside or compressing nuts on another set of bolts, I make a plow with a detachable beam, which possesses all the strength and reliability necessary to a perfect and strong implement.

The force of contortions or twists, which so often occur when one or both shovels become caught under a stone or root, is distributed between the sets of bolts in such way as to prevent their bending, since one set receives all the spreading strains, while the other set receives all the inward or compressing strains, and there is not the chance for twisting or bending the bolts or rods, as is the case where one set of bolts bear interior and exterior bolts, and in consequence strains of all sorts have to be borne by this one set alone without any bracing or relief. By means of this form of connection, also, I am enabled to remove the short beam entirely, as will be readily understood, and run the plow as a single shovel.

Attached to the beams A and A' are the feet or shovel-supports B B. These are made in the form of curved metallic bars or straps of tapering form, the thickest portion coming at the point of greatest curvature. These feet B are held upon the beams by means of bolts $b\,b'$. The bolt $b$ enters the beam at a point near the lower edge, while the bolt $b'$ passes through it near the top. The bolt $b'$ may be inserted in any one of the several holes $b^*$ in the end of the feet and throw the point of the shovel farther forward or backward. The bolts $b\,b'$ pass through the beams at the points farthest removed from each other in reference to the grain of the wood and firmly clamp the curved metal foot to the side of the beam, and instead of making or rendering the beam liable to split they strengthen it and remove the possibility of splitting.

The lower ends of the feet are preferably formed by making a loop of metal, as shown by $B'$, and welding or otherwise securing it to the body of foot B. This gives not only strength and security but also affords a slot or vertical opening, $B^2$, which permits the shovel bolt or bolts to be set at any height desired on the foot, thus enabling me in effect to convert a short into a long shovel, or a long into a short shovel; but I would not be understood as confining myself to providing the slot $B^2$ in the manner set forth above, as it is evident that I could make it by opening the lower end of a solid foot.

In front of the feet, on each beam, is suspended the clod and root cutter, C, which consists of a circular disk of steel with sharp edge all around. This cutter is suspended in a bifurcated hanger, $C'$, which straddles the disk and forms bearings in its lower end for the center or pivot $C^*$, on which the said disk or cutter revolves. The hanger above the bifurcated end is suitably shaped, and passes through an opening in the beam. For a proper distance above and below the beam the hanger is screw-threaded and is provided with two nuts, one above and the other below the beam, by means of which the said hanger can be moved and set vertically to adjust the cutter to a higher or lower position and accommodate it to the depth of plowing, or to the depth desired to be cut by the said cutters.

The position of the clod-cutters is such as to split the center of the furrow for the ordinary cultivator-shovel or "scooter," or to cause the dirt all to turn one way when a turning-shovel is used. It is evident that the hangers can be removed by taking off the top nut when they are not needed.

D D are the handles, which are both secured or fastened to the long beam in front, as shown. They are supported in the rear by bars or rods $d\,d$, which are secured at the lower ends to beams A and $A'$, and pass through boxes or slots $d'\,d'$ on the handles, where they are held at any height by means of pins or bolts $d^*\,d^*$, which render the handles adjustable up or down, as required to suit the height of the plowman or the service in which the plow is employed. The adjusting means may be placed upon the beams instead of upon the handles, if desired; but I think it best to locate it as shown. I prefer to place these supporting-bars upon the two beams, as shown; but I make the one which rests upon or is secured to the short detachable beam removable, so that it can be shifted to the long beam when it is desired to remove the short beam and run the plow as a single-stock plow.

From this description it can be readily seen how the changes and alterations for various services as outlined in the opening of this specification can be effected quickly and easily.

The removal of the cutters renders the plow available as a covering-plow. The cutters are also serviceable in protecting the plow from concussions or strains. When they strike a root or other obstacle which they cannot cut, they will ride over it and raise the shovel also, thus preventing shocks and breakage.

The plow can be made light enough for one or heavy enough for two or more horses, as may be required.

By means of the slot in the bottom of the feet one plow may be made to run deeper than the other.

By the various changes possible by my construction the plow is made equally useful for breaking, bedding, or preparing land for any crops or for cultivating any growing crop, and at the same time the plow is a very easy-running and easily-manipulated one.

Having thus described my invention, what I desire to claim and secure by Letters Patent is—

In a plow, the combination of the posts, handles, main beam A, and detachable short beam $A'$, with the sets of bolts $a$, having nuts on them outside of the beams, and the sets of bolts $a'$, having nuts on them inside of the beams, said two sets of bolts connecting the said beams, in the manner and for the purpose set forth.

In testimony whereof I affix my signature in presence of two witnesses.

WILLIAM W. WEBB.

Witnesses:
W. A. PARDEE,
WILLIAM RICKERS.